United States Patent [19]

Salloum

[11] 4,023,687

[45] May 17, 1977

[54] CONTAINER HANDLING STRUCTURE

[76] Inventor: Charles R. Salloum, 120 Ellis St., Apt. 307, San Francisco, Calif. 94102

[22] Filed: Feb. 27, 1975

[21] Appl. No.: 553,600

Related U.S. Application Data

[63] Continuation-in-part of Ser. No. 287,750, Sept. 11, 1972, abandoned, which is a continuation of Ser. No. 52,381, July 6, 1970, abandoned, which is a continuation-in-part of Ser. No. 720,952, April 12, 1968, Pat. No. 3,613,909, which is a continuation-in-part of Ser. No. 404,622, Oct. 19, 1964, Pat. No. 3,378,151, and a continuation-in-part of Ser. No. 646,671, June 16, 1967, Pat. No. 3,382,990.

[52] U.S. Cl. .................. 214/16.4 R; 214/16.1 A; 214/16.1 DB
[51] Int. Cl.² .......................................... E04H 6/06
[58] Field of Search ............... 214/16.1 R, 16.1 A, 214/16.1 CF, 16.1 D, 16.1 DA, 16.1 DB, 16.4 R, 16.4 A

[56] References Cited

UNITED STATES PATENTS

| 1,528,893 | 3/1925 | Rother | 214/16.1 A |
| 2,676,714 | 4/1954 | Buranelli | 214/16.1 A |
| 2,899,086 | 8/1959 | De Saint-Andre | 214/16.1 CF |
| 3,613,909 | 10/1971 | Salloum | 214/16.1 A |

FOREIGN PATENTS OR APPLICATIONS

| 1,196,393 | 5/1959 | France | 214/16.1 CF |
| 1,402,867 | 10/1965 | France | 214/16.1 A |
| 1,195,126 | 5/1959 | France | 214/16.1 A |
| 74,773 | 1/1961 | France | 214/16.1 DB |

Primary Examiner—Robert J. Spar
Assistant Examiner—R. B. Johnson
Attorney, Agent, or Firm—Gregg, Hendricson, Caplan & Becker

[57] ABSTRACT

A multilevel structure having elevators extending between levels and each including conveyor means for moving containers or the like on and off of the elevators. One or more annular storage platforms at each level are mounted for controlled rotation or angular indexing and each platform includes idlers or the like for ready movement of containers thereon.

4 Claims, 10 Drawing Figures

CONTAINER HANDLING STRUCTURE

The present application is a continuation-in-part of my copending application Ser. No. 287,750 filed Sept. 11, 1972 and now abandoned, that in turn was a continuation of application Ser. No. 52,381 filed July 6, 1970 and now abandoned, that in turn was a continuation-in-part of application Ser. No. 720,952 filed Apr. 12, 1968 and now U.S. Pat. No. 3,613,909, that in turn was a continuation-in-part of application Ser. No. 404,622 filed Oct. 19, 1964 and now U.S. Pat. No. 3,378,151 and a continuation-in-part of application Ser. No. 646,671 filed June 16, 1967 and now U.S. Pat. No. 3,382,990.

BACKGROUND OF INVENTION

In the use of cargo containers, for example, it is often necessary to provide temporary storage for use between rail or truck transportation and ship transportation. Such storage is preferably located on a dock or wharf in order to most readily and rapidly load or unload a ship. However, the capacity of many ships is far in excess of the storage capability of the dock or the like. It is also convenient, if not necessary, to load a ship in a particular order either to facilitate unloading or for other reasons. This then normally requires storage in an inverse order or the rail or truck delivery of containers in particular order.

Preferably, temporary container storage should provide high density storage with ready access to eacy container. This then would alleviate the space problem on or near docks and also would facilitate loading and unloading in predetermined order.

SUMMARY OF INVENTION

The invention provides a structure or building having a plurality of floors with elevators extending between floors. These floors are vertically spaced and may extend above and/or below ground level. The elevators each incorporate a conveyor on the surface thereof so that an item such as a cargo container may be drawn onto the elevator and discharged therefrom by the elevator itself. It is noted at this point that the present invention is herein described with respect to the storage of cargo containers of the type generally employed in the transportation industry; however, the invention is equally applicable to the storage of other items such as automobiles, for example.

The storage levels of the structure hereof each include at least one annular rotary storage platform having storage spaces circumferentially thereabout. Each storage space has the surface thereof formed of rollers or the like so that a container may be readily moved thereon for placement in and removal from the space. The storage spaces are dimensioned to each receive a single container and are inclined downwardly from the elevators.

Removal of containers from storage spaces of the structure is accomplished by controllably movable means cooperating with storage spaces aligned with elevators to push containers from storage spaces into engagement with powered conveyors that complete removal of containers from the spaces. Certain alternatives or variations of the present invention are provided, particularly in connection with removal of containers from storage spaces of the structure. Thus movable bumpers may be aligned with elevators to push containers from storage spaces, pivotally mounted storage floors may be actuated by drive means aligned with elevators or movable chains or the like with container lugs thereon may be employed.

DESCRIPTION OF FIGURES

The present invention is illustrated as to particular preferred embodiments in the accompanying drawings wherein.

DESCRIPTION OF PREFERRED EMBODIMENTS

Figure 1:
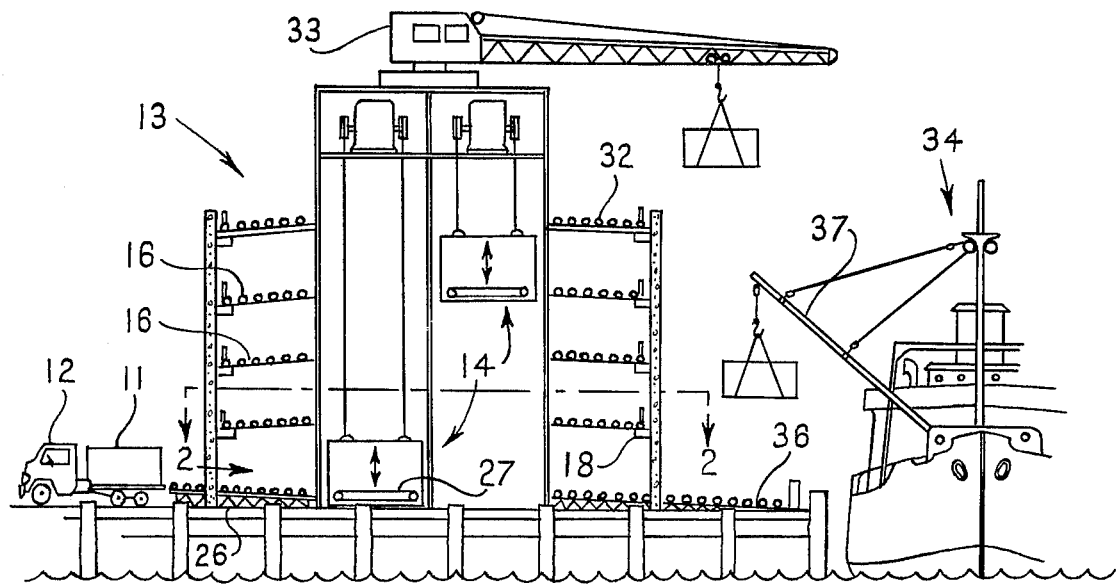
FIG. 1 is a schematic elevational view of a first embodiment of the invention with the exterior wall removed.
Figure 2:
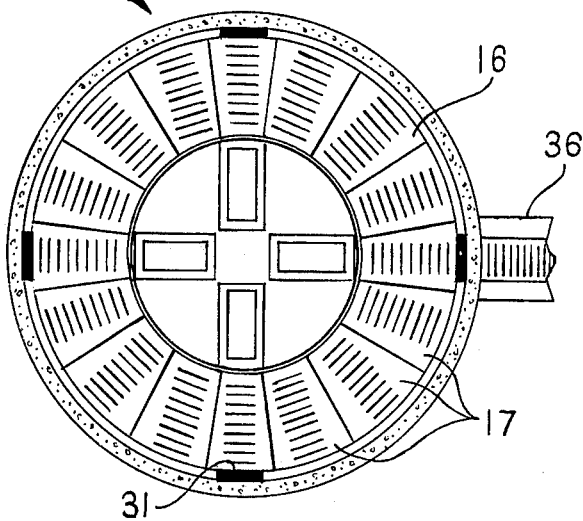
FIG. 2 is a sectional plan view of the container handling structure taken in the plane 2—2 of FIG. 1.
Figure 3:
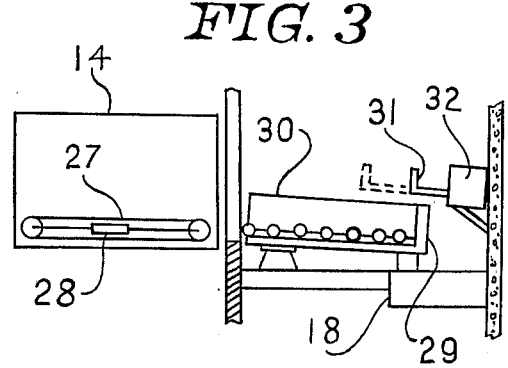
FIG. 3 is a schematic illustration of one elevator and aligned storage space.

Referring first to FIGS. 1 to 3 of the drawings, there will be seen to be illustrated a structure and system for the storage and handling of items such as cargo containers. Referring now to this particular application of the present invention, it is to be noted that containers of uniform size are widely employed for the purpose of transporting cargo both by land and sea. With regard to the transfer of such cargoes from land transportation to ships, it is common to require some type of temporary storage inasmuch as one or possibly two containers might comprise the entire load of a vehicle such as a truck 12 and yet large numbers of such containers are to be loaded upon an individual ship. The present invention provides a building 13 having a central circular core incorporating a plurality of vertically movable elevators 14 as illustrated, for example, in FIG. 2. Any desired number of elevators may be provided in the array thereof as discussed in more detail below.

The building structure 13 comprises a plurality of vertically spaced storage levels above the first level and, referring now to FIG. 2, it will be seen that there is provided at each storage level at least one rotary mounted annular storage platform 16. This platform 16 is disposed immediately outward of the central elevator core and is mounted for rotation or rotary indexing. The platform is divided into a substantial number of storage spaces 17 contiguously disposed circumferentially about the platform and each extending radially thereacross. Indexing means 18 are provided for controllably turning the platform 16 to locate desired storage spaces 17 in radial alignment with elevators 14. The platform may be mounted for rotation by a variety of means such as rollers, casters, ball bearings, V-grooved wheels or the like and the indexing or drive means 18 may, of course, take a variety of forms capable of remote control. Such indexing means 18 are only schematically illustrated in FIG. 1.

Considering now operation of the invention and further portions thereof, it is first noted that the lower level of the structure 13 may be provided as a loading level wherein a truck or the like 12 may drive into or back into the structure for removal of containers therefrom onto an elevator 14. As shown in FIG. 1, there may be provided idlers 26 formed, for example, of rollers upon which a container may be placed for ready movement from the truck to the elevator. These loading idlers may be disposed at a slight incline so as to facilitate movement of the container thereon into the elevator. The floor of the elevator, or at least the majority of such floor, is formed as an endless belt conveyor 27 controllably movable in either direction by drive means 28, schematically shown in FIG. 3. Thus, as a container is moved along the idler 26 to extend into the elevator, the conveyor is operated to move the surface thereof inwardly of the elevator and consequently to draw the container into the elevator whereat the conveyor is stopped with the container properly located for elevator movement. It will, of course be appreciated that there may be provided on the elevator conveyor 27 projections such as teeth or the like that would engage a partially ribbed surface or aligned depressions on the under side of the container to provide a more positive engagement between conveyor and containers, if necessary. Such structures are known in the art and thus are not further described herein.

Each elevator is dimensioned to readily hold a single container and after the container is located therein at the first level of the building structure 13, the elevator is then raised to an appropriate storage level of the structure. The storage platform 16 is then circumferentially indexed or rotated to place an empty storage space 17 radially outward of the elevator with the container thereon. The elevator conveyor is then operated to move the upper surface thereof outwardly of the structure and thus to move the container out of the elevator. The annular storage platforms 16 slope radially outward as indicated in FIG. 1 and each of the storage spaces 17 is provided with idlers which may, for example, be in the form of space metal rollers mounted for free rotation so that the container moves freely thereover as urged by the elevator conveyor. Alternatively, the spaces 17 may be provided with Round Way bearings or other equivalent of idler rollers. As shown in FIG. 3, a stop is provided at the outer end of each storage space as, for example, in the form of a curb or the like 29 and, as stated, the storage spaces each slant slightly outwardly of the building so that the container rolls easily into the space and is retained in stored position in the space once it is placed therein. There is also provided lateral guides or side walls 30 for each space to confine a container therein. As noted above, any desired number of elevators may be provided in the building structure and provision is made on the entrance or bottom level for access to the elevators by trucks, trains or the like carrying containers. If desired, a truck, for example, may be backed to an elevator rather than employing the idlers 26 outside of the elevators. Alternatively, if wheeled containers or the like such as, for example, automobiles are to be stored in the structure, it will be necessary that the front wheels of same be conveyed on the elevator so that the elevator may then draw the vehicle thereon for raising it to a storage level. In this instance a depression may be provided in each space 17 to arrest outward vehicle movement rather than employing the curb for such purpose.

It will be appreciated that with the above described structure it is quite simple to load each of the storage spaces of each rotary storage platform of the building structure. It is only necessary to circumferentially index a storage platform to present successive empty storage spaces to the exit of elevators and then to move containers from the elevators by the conveyors thereon into the storage spaces. With regard to unloading of the building structure, it is first noted that means are provided for urging containers from storage spaces into elevators. Such means are shown in FIG. 3 to be provided in the form of movable bumpers 31 mounted radially outward of the rotary platform 16 and aligned with separate elevators, as shown in FIG. 3. Drive means 32 are provided for each of the movable bumpers for forcing the bumper inwardly of the building structure to thus engage a container in a storage space and push the container over the rollers of the space partially into an elevator. The container then rests in part upon the conveyor with the align elevator so that actuation of the conveyor draws the container into the elevator. Removal of the container from the building 13 is accomplished at one or more exit points and in FIGS. 1 and 2 there are shown exits at the first level and at the top level. An upper uncovered loading level 32 may be provided about the elevator core atop the building. If the building is very high, a building crane 33 may be mounted on top of same to lift containers from the loading level 31 for loading containers onto a ship 34, for example. The first level exit is shown to include a lower loading level 36 extending radially from the building and having idlers or the like extending thereacross whereby containers may be rolled from the building for access by a crane such as a ship's crane 37.

In the unloading of containers from storage spaces each rotary platform may be indexed to provide any desired storage space in alignment with an elevator so that the container in such space may then readily be moved to an unloading level of the building to be picked up by a crane and placed on the ship. Thus the ship may be loaded with containers in desired order thereof no matter how these containers may be disposed within the storage structure. This will be seen to be highly advantageous. It is furthermore possible during loading of a storage structure to dispose individual containers at any desired position therein and this provides an even further dimension of control over loading and unloading operations.

It will of course be appreciated that the present invention is equally applicable to the unloading of containers from ships and the storage of same in the building structure 13 for subsequent reloading of other ships or loading of trucks or trains to remove the containers from the storage building. The degree of control afforded by the building structure and the container handling system therein clearly provides a substantial advantage over conventional stacking of containers or parking of vehicles or the like wherein problems of ordered loading and unloading become significant.

Figure 4:
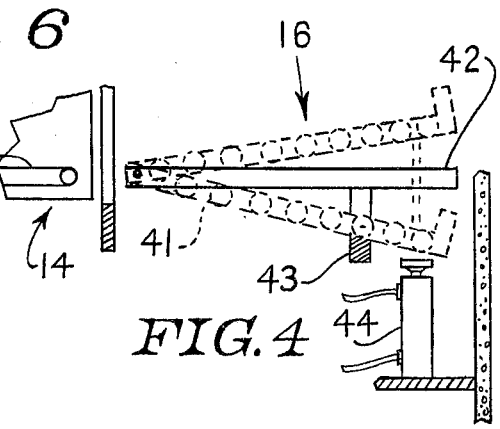
FIG. 4 is a schematic illustration of an alternative storage space structure.

Movement of containers from storage spaces on the annular rotary platforms hereof into selected elevators may be accomplished in a variety of ways. There has been described above a movable bumper arrangement in connection with the illustration of FIG. 3; however, for certain configurations of the present invention, it may be preferable to employ alternative unloading means for removing containers in storage spaces. In FIG. 4 there is illustrated an alternative structure for container unloading means from storage spaces wherein each storage space has the floor thereof comprised as a pivotally mounted floor element 41. The floor 41 is mounted to pivot about the end thereof adjacent the elevator core and is pivoted upon a frame 42 of a rotary mounted storage platform 16. This storage space floor 41 may be comprised as laterally mounted rollers or idlers between guide members and normally extends slightly downwardly from the pivot axis thereof radially outward of the platform and such inclination is exaggerated in FIG. 4 to emphasize the direction of inclination. A container moved from the elevator 14 on to the floor 41 by the elevator conveyor belt will smoothly roll into the storage space with the floor being maintained in inclined position by appropriate structural members 43 of the rotary platform. Removal of the container from the storage space is herein accomplished with the space aligned with an elevator and by the provision of means for pivoting the floor 41. Such means may comprise a hydraulic or pneumatic cylinder 44 mounted on the building structure itself beneath the rotary platform in alignment with the elevator. Actuation of this hydraulic cylinder forces the piston rod thereof upwardly to engage the under side of the floor 41 and pivot the floor into the position illustrated in dashed lines in FIG. 4 so that the floor is then inclined radially inward in the structure. In this position a container mounted on the rollers of the floor will roll on to the conveyor 27 so that operation of the latter will draw the container entirely within the elevator. Return of the piston of the hydraulic cylinder 44 to normal position allows the floor 41 to pivot back into normal position for receiving another container. It will be appreciated that only one lifting mechanism is required for each elevator inasmuch as the hydraulic cylinder, for example, is not mounted on the rotary platform, although, of course, it would be possible to so construct the apparatus. The provision of a tilting or pivotally mounted storage space floor minimizes the radial extent of the building structure required in order to move containers from storage spaces into elevators.

Figures 5, 6:
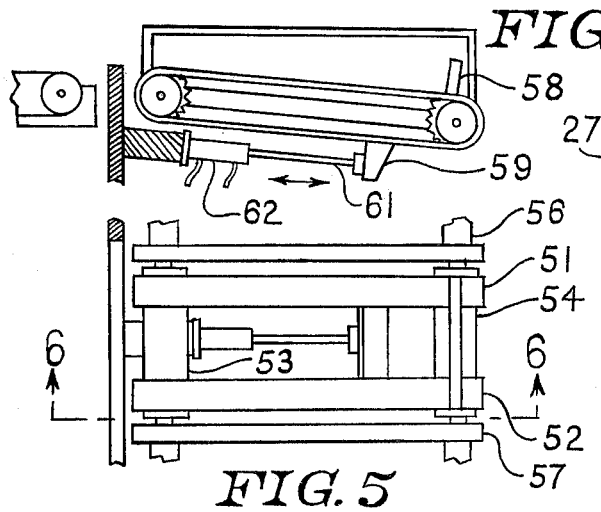
FIG. 5 is a schematic illustration in plan view of a further alternative storage space structure.
FIG. 6 is a sectional view taken in the plane 6—6 of FIG. 5.

In FIGS. 5 and 6 there is illustrated a further storage platform floor structure wherein multi-link chains such as timing chains or the like are employed as the floor of the storage space. Referring now to FIGS. 5 and 6, there will be seen to be provided two chains 51 and 52 extending about rollers 53 and 54 that are journaled for rotation in side members 56 and 57 of a rotary storage platform 16. The chains 51 and 52 are prevented from lateral movement on the rollers as by appropriate engagement therewith and may, in fact, be connected to the rollers as by provision of cogs in the rollers which are mounted for free rotation. The upper surface of the floor of the storage space is aligned with the upper surface of the conveyor belt 27 in the elevators and with the storage space floor being inclined downwardly radially outward of the elevators, it will be seen that movement of a container by the conveyor belts in the elevator on to the storage space floor will cause the container then to move with the chains on the freely rotating rollers 53 and 54 fully into the storage space. Provision is herein made for terminating this movement when the container is entirely outside of the elevator and this may, for example, comprise a stop or crosspiece 58 secured as by welding across the chains 51 and 52 in position to align with the top of the outer roller 54 when the container is fully within the storage space. Movement of the chains at this orientation of the stop 58 may be accomplished in a variety of ways and, as illustrated in FIGS. 5 and 6, a drive plate 59 is secured across the chains beneath the rollers in position to engage a piston arm 61 of the hydraulic cylinder at this point. This hydraulic cylinder 62 is shown to be mounted upon the building structure so as to terminate movement of the chains when the container is fully within the storage space. The container may then be readily moved from the storage space into engagement with the elevator conveyor belt by operating the hydraulic cylinder 62 to extend the piston arm 61 therefrom and consequently to rotate the chains in a counterclockwise direction, as shown in FIG. 6, so that the crosspiece or stop 58 pushes against the container and moves it to the left in FIG. 6.

The storage space embodiments of the present invention, as illustrated in FIGS. 4 and 6, are particularly useful in building structure in accordance with the present invention wherein radial extent of the structure is limited. Particularly in those embodiments of the present invention wherein more than one concentric rotary platform is provided at each level, it is advantageous, if not necessary, to limit the physical length of any type of pusher or bumper that may be employed to urge containers into elevators. It is also possible to employ alternative mechanical means for urging the container or the like from a storage space of a rotary platform hereof such as, for example, a pivotal parallelogram, a telescopic piston or the like, or other types of linkages wherein forces may be applied, for example, vertically from above or below the rotary platform.

Figure 7:
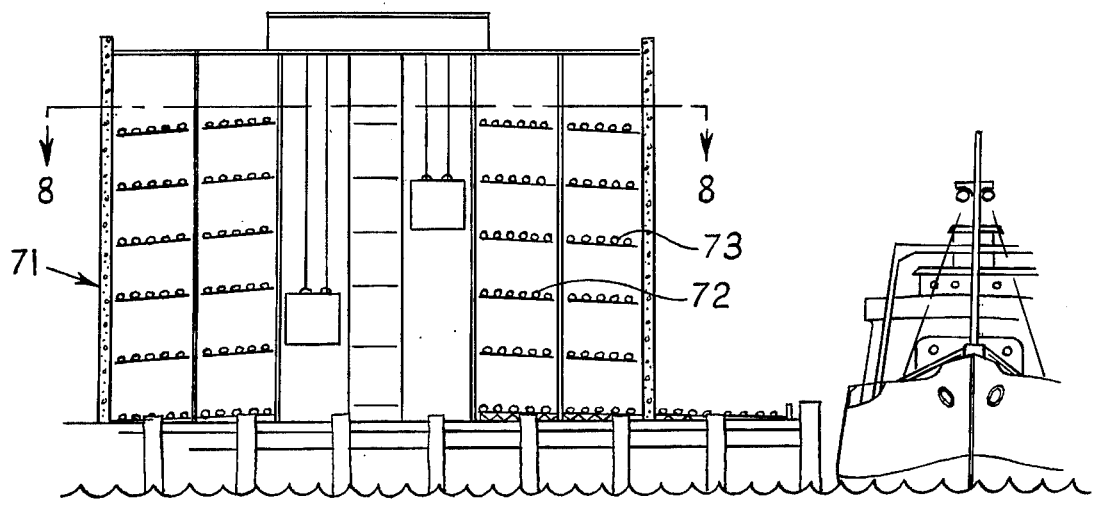
FIG. 7 is an elevational view of an embodiment of the container storage structure of this invention incorporating a pair of rotary platforms at each level.
Figure 8:
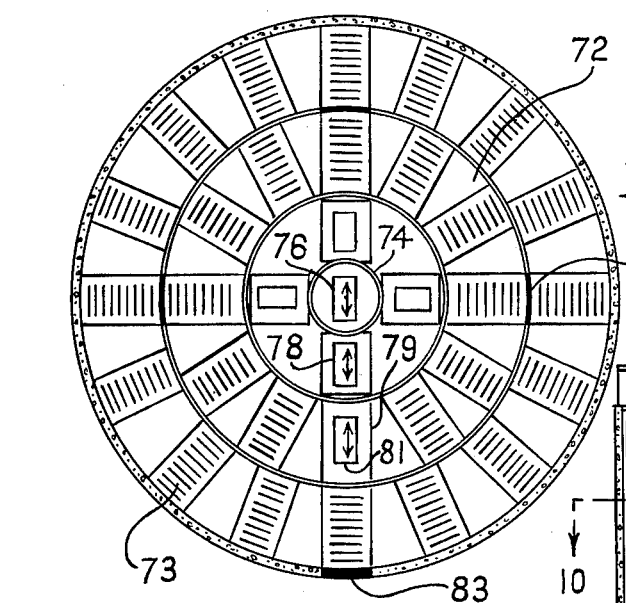
FIG. 8 is a sectional view taken in the plane 8—8 of FIG. 7.

The present invention furthermore provides for building structures of larger size than that of the above described embodiment. In order to expand the storage capabilities of the structure in accordance with the present invention there may be provided more than one rotary storage platform per level. Referring to FIGS. 7 and 8, there will be seen to be shown a storage structure 71 incorporating two rotary storage platforms 72 and 73 per level. These platforms are concentrically disposed about a central core of the elevators 14; however, in this embodiment of the invention the center of the elevator core is provided with a turntable 74 at each level. The turntable 74 is provided with a conveyor 76 thereon, again as shown in FIG. 8. The elevators are open at the storage levels both radially outward and inwardly thereof and again each elevator incorporates a conveyor, as described above in connection with the embodiment of FIG. 1.

Movement of containers or the like into and out of the storage structure 71 of FIGS. 7 and 8 may be accomplished by loading of the elevators at the ground or bottom level in any desired manner such as, for example, as described above and then movement of the container upwardly by the elevator to a desired storage level such as the one illustrated in FIG. 8. At this point the container is moved radially outwardly of the elevator for disposition in a selected storage space of the inner storage platform 72. The individual storage spaces of this platform are formed in the same manner as described above in connection with FIG. 2 and the platform may be rotated to dispose any desired storage space in front of any desired elevator. In order to place a container in a storage space of the outer rotary storage platform 73 such container is moved from the elevator radially inward onto the turntable 74 but first the turntable is rotated to align conveyor 76 thereof with the elevator from which the container is to be received. Following movement of the container to the turntable onto the conveyor thereof, the turntable is rotated to align the conveyor 44 with a driveway 77 extending radially outward through the elevator core, as indicated in FIG. 8. This driveway also incorporates a conveyor 78 of the same type described above and upon actuation of the conveyor of the turntable the container is then transferred onto the conveyor of this driveway. The inner rotary platform 72 is also provided with a driveway 79 thereacross and such driveway is likewise provided with a conveyor 81 so that the container may be moved from the first driveway 77 onto the second driveway 79 and thence by means of the conveyor 81 in the latter urged radially outward into any desired storage space of the rotary platform 73 by rotation of the outer platform to align such space with the driveway. In this manner then each of the storage spaces of both rotary storage platforms may be readily loaded from the elevators. As previously noted, each of the storage spaces in both rotary storage platforms is provided with idlers as described above, and thus the containers readily roll into the storage spaces.

Further with regard to the embodiment of the present invention illustrated in FIGS. 7 and 8, it is noted that, in common with the embodiment of FIG. 1, the rotary storage platforms are inclined downwardly, radially outward of the elevator core. This facilitates movement of storage containers or the like into the storage spaces of these rotary platforms and it furthermore prevents inadvertent movement of the containers when stored. This embodiment of the present invention also incorporates container stops or the like to prevent the containers from moving beyond the desired location thereof within the storage space upon loading of such space. There is also provided unloading means 82 about the periphery of the inner platform 72 in alignment with the elevators 14 for selectively urging containers from predetermined storage spaces into elevators to unload the inner rotary platform. A single unloading means is illustrated to be disposed peripherally outward of the outer rotary platform 73 in alignment with the driveway 77 of the elevator core. If more than one elevator core driveway is provided, there is then employed a separate unloading means 83 in alignment with each of such driveways. It will be appreciated that these unloading means 82 and 83 are provided for the purpose of urging containers from storage spaces toward elevators and may be comprised as described above in connection with the descriptions of FIGS. 4, 5 and 6 and alternatives thereto. In order to remove a container from a storage space in the inner platform 72, the platform is rotated to align the storage space of the container with the particular elevator desired to be employed for removal of the container. The unloading means 82 is then actuated to push the container partially onto the elevator whereupon the conveyor of the elevator operates to draw the container the rest of the way into the elevator. The elevator is then moved downwardly to the first level. At the first level the container may be removed from the elevator by actuation of the elevator conveyor to push the container out onto an extended idler strip 36 such as described above. With this extended idler strip being slightly inclined outwardly of the building onto a dock the container will roll outside of the building to the edge of the dock whereat the container may be readily lifted by the freight booms 37 of a cargo ship 34. The containers are then swung aboard the ship and lowered through the hatch in conventional manner to be stored in the hold of the ship. It will be appreciated that for loading and unloading of one ship alongside one side of the dock upon which the structure is built it is necessary to employ only those elevators on that side of the building to remove containers from the building. However, assuming that there are two sides to the dock and a ship may be loaded or unloaded from the other dock side then the elevators on the opposite side of the building would be employed to move containers for this purpose.

With regard to unloading of containers from an outer rotary storage platform 73 of any level of the structure 71, it is only necessary to circumferentially index or rotate the outer platform 73 to align any desired stall with the driveway 77. The inner platform is rotated or indexed to align the driveway 79 thereof with the driveway 77 of the central core. The outer unloading means 83, located radially outward of the outer platform 73 in alignment with the driveways, is employed to push the container at least partially onto the driveway 79 whereat it is engaged by the conveyor 81 of the driveway to be moved inwardly onto the inner driveway 77. The central turntable 74 is rotated to align the conveyor 76 thereof with the inner driveway 77 so that the container may be further moved onto the turntable. The turntable is then rotated to align the conveyor thereof with a desired elevator and the container moved by the conveyors of the turntable and elevator into the elevator for lowering to the ground floor. It will, of course, be appreciated that it is also possible to reverse procedures so that a ship is unloaded of containers which are then stored in the structure 71. In this instance the extended idlers 36 would be inclined in the opposite direction and provision is preferably made for controllably changing the inclination of these extended idlers for this purpose. To this end, of course, there is a variety of different adjusting or control means possible and it may, for example, be convenient to provide the idlers upon extended steel beams or the like which may have adjusting means such as rotary jacks provided for raising and lowering opposite ends thereof to achieve the desired inclination of the idlers so that a container placed thereon may be readily rolled along the length of the idlers to the opposite end thereof.

Figure 9:
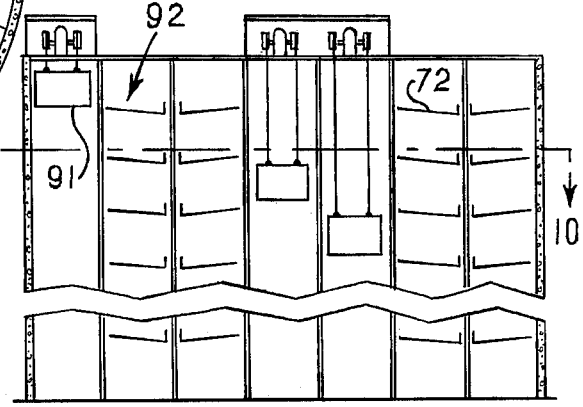
FIG. 9 is an elevational view of an embodiment of the present invention incorporating both interior and exterior elevators.
Figure 10:
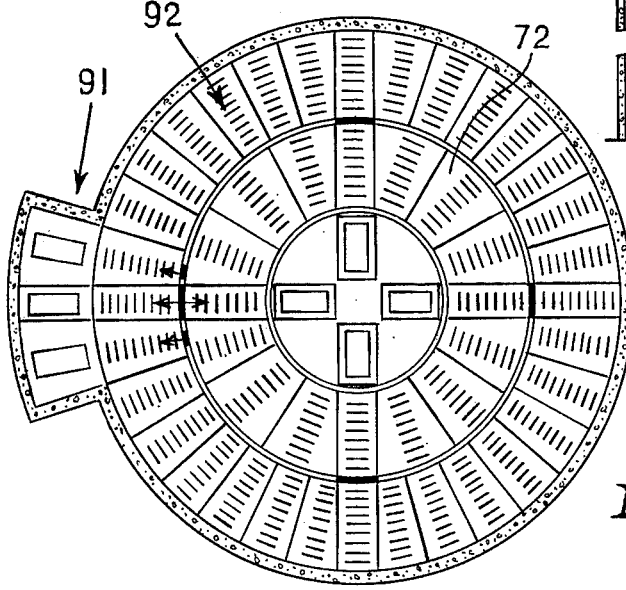
FIG. 10 is a sectional plan view of the embodiment of the present invention illustrated in FIG. 9 and taken in the plane 10—10 of FIG. 9.

It is realized that the present invention is adapted to be constructed upon other structures which may have limited dimensions. Thus the structure of FIG. 1, for example, is highly desirable under those circumstances where a dock of limited width is available. However, when more physical space is available on a dock, wharf or the like, a double rotary platform storage system such as illustrated in FIGS. 7 and 8, may be employed. In addition, where sufficient space is provided, there may also be employed, in accordance with the present invention, exterior elevators such as indicated in the embodiment of FIGS. 9 and 10. This embodiment may have the general configuration of the structure of FIG. 7 with the addition of external elevators 91. These outer elevators open inwardly to an outer rotary storage platform 92 at each level and preferably open radially outward of the building at the bottom or dock level. With the provision of these additional exterior elevators then, it is not necessary to incorporate a central turntable in the middle of the building, for the elevators 14 of the central core open only radially outward of the building to the inner radial storage platform 72.

The storage spaces of the inner rotary platform 72 are slanted downwardly toward the exterior of the building away from the inner elevator core, as illustrated in FIG. 9. Conversely the outer rotary platform 92 has the storage spaces thereof slanted downwardly away from the outer elevators, i.e., toward the central core of the building. It will be seen that the foregoing is in conformity with the other embodiments of the present invention wherein storage spaces are slanted away from elevators with which they cooperate. No attempt is made in FIGS. 9 and 10 hereof to illustrate the details of platform mounting, drive or storage space unloading means, for the same structures described above in connection with prior embodiments of the present invention are equally applicable hereto. In this instance the inner elevators are employed only to load and unload the inner rotary storage platform 72 and the outer elevators 91 employed only to load and unload the outer rotary storage platform 92. If it is desired to employ each of the inner elevators for both loading and unloading of the inner platform, then it is necessary to provide unloading means 82 in alignment with each inner elevator and disposed between the inner and outer rotary platforms, as indicated. On the other hand, if some of the inner elevators are to be employed only for loading the building and others for unloading it, it is only necessary to provide the unloading means in alignment with the unloading elevators. With regard to the exterior elevators 91, the same general situation exists and there are provided unloading means 93 in alignment with those exterior elevators to be employed for removing containers from the building. Such unloading means are movable outward to push conveyors radially outward from storage spaces on the outer platform at least partially into the outer elevators whereat conveyors on the floor thereof draw the containers into the elevators. One or more of the unloading means 93 may be double acting to move containers inwardly from the inner platform and outwardly from the outer platform if the inner and outer elevators are aligned. At the bottom level of the structure there may be provided exit means such as idlers extending radially outward from the outer elevators and again these may be inclined downwardly away from the building for unloading of containers from the storage building or inclined inwardly toward the building for the loading of containers into the storage building.

In the above-described embodiments of the present invention it is to be appreciated that any desired number of elevators in the inner core of the structure may be provided. The choice of the number of elevators is dependent upon a number of factors including the height of the building, the necessary limitations upon time and movement of containers into and out of the building, and also the cost thereof. Similarly, any desired number of exterior elevators may be provided, again depending in part upon physical space available on the docks or the like, as well as those criteria identified above. The illustrations of the present invention in the drawings hereof show a large number of inner core elevators; however, practical embodiments of the invention may well incorporate but a few inner elevators. Furthermore, it is not necessary for these elevators of the inner core to necessarily be spaced equidistant apart about the core. For certain applications the requirements thereof may be best satisfied by banks of inner core elevators placed in particular positions for loading or unloading depending upon the physical set-up of the dock or the like. Similarly, it is noted that combinations of particular structures as illustrated in the various embodiments described above are, of course, possible in accordance with the present invention. Thus, for example, a tall building need not employ two rotary storage platforms per level. Also it may, for example, be desirable to provide unloading means such as movable bumpers for urging stored containers into different elevators at separate levels. Thus a particular elevator might be adapted to unload certain levels of the building and not others, again depending upon the particular application of the invention and the circumstances surrounding same.

With regard to variations in the present invention it is noted, for example, that the storage platforms are preferably mounted for rotation in either direction so as to be moved a minimum distance to align any storage space with any elevator. Also, if wheeled containers are to be stored, the idlers may not be required except in the case of automobile storage where the brakes are to be set. The invention is particularly adapted to safe-guarding and even concealment of containers or the like during storage, as the invention is preferably formed with solid outer walls and may, in fact, be constructed underground if desired. Thus various materials such as munitions, perishable or easily damaged goods, or the like, may be advantageously stored, and the term "container" as employed herein is intended to include such items.

It is not intended herein to limit the present invention to a single particular structure having, for example, a precise pre-stated number of elevators, storage levels, container unloading means or the like, for the invention provides an improved container storage structure and system having a high degree of flexibility for utilization under a variety of circumstances and in different physical situations. Thus the invention is not to be limited to the precise details of illustration or description.

What is claimed is:

1. A container storage system comprising
    a building structure comprising a plurality of vertically spaced storage levels with a circular wall thereabout,
    A central core extending through said storage vessels with at least one annular rotary-mounted storage platform at each level with each platform having a plurality of circumferentially spaced storage spaces extending radially across the platform and each space having rollers rotatably mounted laterally thereacross for facilitating the movement of a container into and out of the space, said storage spaces each having a floor inclined radially outward and downwards relative to said central core,
    a plurality of elevators each with a floor and extending vertically through said structure in said central core within said annular platforms and said elevators opening outwardly directly onto a storage platform at each of said storage levels at the upper end of the storage spaces of the platform adjacent said central core, each of said elevators having controllably operable conveyor means on the floor thereof for horizontal movement of a container into and out of an elevator, controllably operable unloading means at each of said levels having controllable drive means mounted on the interior surface of said circular wall above the end adjacent the lower most portion of the inclined floor in alignment with at least one elevator at each storage level and an element movable thereby for engaging a container disposed in a storage space aligned with an elevator and urging the container toward and at least partially into the elevator onto the conveyor thereof whereby the container may be drawn into said elevator, and controllable drive means for rotatably indexing said storage platforms to align any desired storage space with a selected elevator whereby all storage spaces may be loaded and unloaded in any desired order.

2. The container storage system of claim 1 further defined by one annular platform at each storage level being disposed substantially contiguously with said central core of elevators and having the inner circumference thereof vertically aligned with the conveyors in said elevators with the storage spaces thereof sloping downward radially outward of said elevators with stop means at the radially outer ends of the storage spaces whereby a container moved into a storage space from an elevator conveyor rolls down to the outer end of the space.

3. The container storage system of claim 1 further defined by each storage level having two concentric and adjacent annular storage platforms separately angularly indexable and each having storage spaces thereon sloping radially outward of the central core and the surfaces of the storage spaces of separate platforms being aligned on the slope, a central turntable having a conveyor thereon disposed in the middle of the central core at each storage level, at least one of the elevators opening inwardly to the turntable at each level, a passageway in the core between elevators at each level with a conveyor thereon extending substantially from the turntable to the inner platform, and the inner platform at each level having at least one passageway radially thereacross with a conveyor thereon whereby a container is movable between elevator and outer platform across said passageways and turntable.

4. The container storage system of claim 1 further defined by a pair of concentric annular storage platforms at each level with each platform being separately annularly indexable, the inner platform at each level having circumferentially aligned storage spaces thereabout with the floors thereof sloping downwardly radially outward of the central core, the outer platform at each level having circumferentially aligned storage spaces thereabout with the floors thereof sloping downward radially inward toward said central core, and at least one outer elevator having a conveyor thereon in said structure disposed immediately adjacent the periphery of said outer platforms and extending between said storage levels for moving containers between levels for loading and unloading said outer platforms.

* * * * *